United States Patent Office 3,182,021
Patented May 4, 1965

3,182,021
LUBRICANTS CONTAINING PHOSPHORUS
THIOIC DERIVATIVES
Peter A. Asseff, Euclid, Ohio, assignor to The Lubrizol
Corporation, a corporation of Ohio
No Drawing. Filed Jan. 27, 1955, Ser. No. 484,594
6 Claims. (Cl. 252—46.6)

This invention relates to lubricants and in particular to lubricants which are effective under conditions of extreme pressure. It relates more particularly to the use in lubricants of compositions which enable these lubricants to bear up under conditions of extreme pressure.

It is a principal object of the invention to provide novel lubricating compositions which are of particular value as gear lubricants.

It is another object of the invention to provide a novel class of additives for use in lubricants.

It is a still further object of the invention to reduce wear of relatively moving surfaces.

Other objects will be apparent from the following description of the invention.

The above objects are achieved by the process which comprises the reaction of a phosphorus thioic acid with an organic epoxide. The process may be defined more narrowly as comprising the reaction of a phosphorothioic acid having the structure

where A and B are the same or different non-functional radicals selected from the classes consisting of RO, RS, and R; and R′O, R′S, and R′ respectively, and X is selected from the class consisting of oxygen and sulfur, with an approximately equivalent amount of an organic compound selected from the class consisting of epoxides and thioepoxides.

It will be seen from the above formula that the phosphorus thioic acid starting materials described herein may contain 1, 2, 3 or 4 sulfur atoms. It is preferred, however, to use the phosphorodithioic acids, in which there are present 2 sulfur atoms per molecule.

The non-functional organic radicals of the above structure may be aliphatic or aromatic and may contain organic or inorganic substituents. The term "non-functional" is used to indicate that the radicals do not take part in or have any significant influence upon the reaction of the process. Illustrative types of organic radicals include alkyl, cycloalkyl, aryl aralkyl, alkaryl, alkenyl, cycloalkenyl, etc. and the substituted derivatives of these, e.g., nitro-, halo-, alkoxy-, hydroxy-, carboxy-, etc. Generally these organic radicals are hydrocarbon radicals. Particularly useful products for use in lubricants are those derived from dialkyl phosphorothioic acids.

As indicated previously an especially preferable class of phosphorus thioic acids are phosphorodithioic acids. These phosphorodithioic acids may be prepared by the well-known reaction of phosphorus pentasulfide with the hydroxy compound which corresponds to the organic radicals R and R′. This reaction is illustrated by the action of phosphorus pentasulfide on ethyl alcohol to produce O,O-diethyl phosphorodithioic acid. In similar fashion aliphatic hydroxy compounds such as propyl, butyl, isobutyl, amyl, hexyl, cyclohexyl, n-octyl, iso-octyl, lauryl, etc. alcohols or aromatic hydroxy compounds such as phenol, alkylated phenols, naphthols, alkylated naphthols, and the like may be reacted with phosphorus pentasulfide to produce phosphorodithioic acids of utility as starting materials for the present invention.

The organic epoxides and thioepoxides may be represented as having the structural grouping

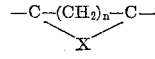

where $n$ is 1 or 0, and X is oxygen or sulfur, and those epoxides and thioepoxides are preferred in which one of the above-indicated carbon atoms is also attached to two hydrogen atoms. In other words, the preferred epoxides and thioepoxides are terminal epoxides and have the structural grouping

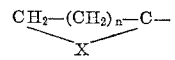

where $n$ and X are as described above. These have been given the name "terminal" epoxides and thioepoxides because they may be thought of in many cases as being derived from a vinyl compound or one which has a terminal olefinic double bond.

The term "epoxide" is used hereafter in a broad sense to denote both the epoxides and thioepoxides.

Specific examples of suitable epoxides include ethylene oxide, propylene oxide, epichlorohydrin, 1-butene oxide, butadiene monoxide, 1-amylene oxide, styrene oxide, epoxidized fatty oils, epoxy stearic acid, propylene sulfide, etc.

The reaction of the phosphorus dithioic acid with an organic epoxide is exothermic. Although it is not necessary, it is preferred to control the temperature of the reaction mixture so that it is reasonably constant throughout the course of the reaction. The temperature of the reaction may be as low as —60° C. or lower and on the other hand it may be as high as 100° C. or even higher. Generally, for reasons of economy it is preferred to carry out the process at room temperature.

The reaction appears to involve equimolar proportions of the phosphorus dithioic acid and the epoxide. The identity of the product has not been established and so it is best described in terms of its method of preparation. The products are neutral, have a phosphorus to sulfur ratio of 1:2, and as indicated before appear to result from the reaction of one mole each of phosphorus dithioic acid and epoxide.

It usually is convenient to use an excessive amount of the organic epoxide so as to insure a maximum yield. In most instances, the epoxide is sufficiently volatile that its removal from the reaction mixture, after the reaction is finished, is a simple operation. In some cases, it is sufficient merely to allow the excess epoxide to evaporate from the product at room temperature, or the product may be flushed with an inert gas such as nitrogen.

A particularly desirable product may be obtained by bubbling an inert gas through the reaction mixture. Such a product has advantages as regards odor, i.e., its odor is either good or non-existent, and in any case is better than the odor of a product prepared without such a step.

As indicated earlier herein, the products of this invention are useful as additives for lubricants and especially so in the lubrication of relatively moving metal surfaces where conditions of extreme pressure exist. In such applications it is advisable to use from about 1 to about 20 percent by weight of the product in the lubricant, and preferably at least 2 percent will be so used.

As is the case with almost all of the better present-day lubricants, those particular lubricants which contain the products of this invention will contain in addition certain other additives to enable the lubricant to perform satisfactorily in various environments. Such additives include principally polysulfides, chlorinated compounds, phosphites, sulfurized fatty oils, etc.

The utility of the hereindescribed products is illustrated by the results of actual tests of lubricants containing these products. One such test is known as a "High Speed Axle Test" and involves the following procedure:

A car is mounted with its rear wheels on rollers and the engine accelerated gradually from 25 m.p.h. to 60 m.p.h. At this point the throttle is opened wide and the engine accelerated to 80 m.p.h. whereupon the throttle is closed completely allowing the speed to drop to 60 m.p.h. This "drive and coast" step is repeated for a total of 25 times. The lubricant is then assigned an overall rating based on the apparent condition of the metallic gear surfaces. This rating is either "pass" or "fail," or in some cases "border-line pass" or "border-line fail."

A Pennsylvania SAE 90 oil containing in one case 7 percent (by weight) of a product prepared as in Example 1, and in a second case 3.5 percent of the same product scored in each case a pass in the above high speed axle test.

It will be noted that the above test is similar to the test procedure AXS-1569 designated by the U.S. Army Ordnance Department as a means of "determining the load-carrying characteristics of universal gear lubricants in axles under conditions of high speed," except that this AXS-1569 procedure requires but 10 "drive and coast" cycles rather than 25. Thus the test to which the above described lubricants were subjected is considerably more severe than Army Ordnance specification.

Lubricants which are used to lubricate gears must perform satisfactorily in critical environments other than that of high speed, of course, and the other principal full-scale gear lubricant test is one which involves conditions of high torque. This particular test labeled AXS-1570 by the U.S. Army Ordnance Department, is designated as the "procedure for determining the load-carrying, wear, stability and corrosion characteristics of universal gear lubricants in axles under conditions of high torque and low speed."

The test involves the performance of a sample lubricant with a new ¾ ton Army truck hypoid rear axle. Test conditions include a ring gear speed of 62 r.p.m. under a dynamometer load of 32,311 lbs. ring torque for 30 hours, and an oil temperature of 200-250° F. At the conclusion of the test the axle is disassembled and its component parts inspected for signs of wear, corrosion, etc., and on the basis of this inspection a rating of pass or fail (or borderline pass or borderline fail) is assigned to the lubricant.

Lubricants containing the products of this invention were subjected to the above high-torque test with satisfactory results. Compositions of typical lubricants which passed this test are as follows:

A

Pennsylvania SAE 90 oil
3.5 percent of a product prepared as in Example 1
1.0 percent of mixed alkyl and dialkyl phosphites
2.0 percent of chlorinated paraffin wax (40% Cl)

B

Pennsylvania SAE 90 oil
3.5 percent of a product prepared as in Example 1
1.0 percent of mixed alkyl and dialkyl phosphites
1.6 percent of chlorinated paraffin wax (50% Cl)

The process of the invention is illustrated in further detail by the following specific examples:

*Example 1*

To 1,780 grams (5 moles) of O,O-di-(2-ethylhexyl) phosphorodithioic acid, stirred at room temperature, there was added portionwise 319 grams (5.5 moles) of propylene oxide. The ensuing reaction was quite exothermic and the temperature rose to 83° C. within 15 minutes. The temperature was maintained at 90-91° C. for three hours, whereupon an additional 29 grams (0.5 mole) of propylene oxide was added. This mixture was maintained at 90° C. for another hour and then concentrated by heating to a final temperature of 90° C./28 mm. The dark yellow liquid residue showed the following analysis:

Percent S _____ 15.4
Percent P _____ 7.4

*Example 2*

To 4,940 grams (15 moles) of O,O-di-(2-methylpentyl)-4) phosphorodithioic acid there was added dropwise over a period of two hours with stirring at room temperature, 1,740 grams (30 moles) of propylene oxide. The temperature was maintained at 35-40° C. throughout the addition and for an additional two hours. Then the mixture was heated at reflux temperature (85-95° C.) and concentrated by heating to a final temperature of 105° C./21 mm. The residue was filtered to give a brown filtrate having the following analysis:

Percent S _____ 17.6
Percent P _____ 8.9

*Example 3*

To 628 grams (2 moles) of O,O-di-(2-methylpentyl-4) phosphorodithioic acid there was added portionwise with stirring over a period of one hour, 184 grams (2 moles) of epichlorohydrin. The temperature was maintained with external cooling at 65-70° C. throughout this period and the mixture was stirred for an additional hour, during which time the temperature receded to 30° C. The product was a green, non-viscous liquid having the following analysis:

Percent S _____ 16.1
Percent P _____ 7.8
Percent Cl _____ 8.6

*Example 4*

A sample of O,O-di-(isopropyl) phosphorodithioic acid weighing 514 grams (2 moles) was treated dropwise at room temperature with a small portion of propylene oxide. The temperature rose rapidly to 96° C., whereupon the addition of propylene oxide was halted. When the temperature had fallen to 30° C., the addition of propylene oxide was resumed until a total of 224 grams (3.9 moles) had been added, the temperature being maintained below 60° C. The resulting mixture then was heated for three hours at 60-65° C. and then concentrated by heating to a final temperature of 115° C./20 mm. The liquid residue showed the following analysis:

Percent S _____ 23.8
Percent P _____ 11.4

*Example 5*

To 193 grams (0.5 mole) of O,O - di - (2 - ethylhexyl) phosphorodithioic acid there was added portionwise at room temperature 78 grams (0.65 mole) of styrene oxide. The exothermic reaction caused the temperature to rise to 75° C. which temperature was maintained for an additional 3.5 hours. The resulting product mixture was washed with dilute aqueous sodium carbonate and then with water. This material was dried with magnesium sulfate, then filtered and the filtrate concentrated by heating to a final temperature of 100° C./6 mm. The yellow, fluid residue showed the following analysis:

Percent S _____ 12.8
Percent P _____ 6.3

*Example 6*

Four hundred eighteen grams (7.2 moles) of propylene oxide was added dropwise over a period of one hour to 1,854 grams (6 moles) of O,O-di-(n-hexyl) phosphorodithioic acid. The temperature was maintained at 53-70° C. by means of external cooling throughout the addition and for an additional hour. The resulting mixture was concentrated by heating to a final temperature of 67°/110 mm. and the fluid residue shown to have the following analysis:

Percent S _____ 17.7
Percent P _____ 8.3

Example 7

A sample of O,O-di-(2-methylpentyl-4) phosphorodithioic acid weighing 335 grams (1.0 mole) was cooled to —30° C. by means of a Dry Ice-acetone bath. To this cooled acid there was added portionwise over a period of one hour 63.8 grams (1.1 moles) of propylene oxide. The propylene oxide was added at such a rate as to maintain the temperature between —30° C. and —35° C. When the addition was complete, the resulting mixture was allowed to warm up to room temperature and any unreacted propylene oxide was removed by evaporation at reduced pressure. The residual product showed the following analysis:

| | |
|---|---|
| Percent S | 17.3 |
| Percent P | 8.2 |

The phosphorus thioic acid-epoxide reaction products are neutral compositions containing the residues of equimolar quantities of the phosphorodithioic acid and the epoxide. As such they are valuable materials and may be used in many applications. They are valuable also as intermediates in the preparation of certain metal-containing derivatives which in themselves are useful materials. The preparation of these metal-containing derivatives involves further treatment of the phosphorothioic acid-epoxide reaction product with a basically reacting inorganic metal compound.

Illustrative examples of basically reacting inorganic metal compounds include principally the metal oxides such as barium oxide, zinc oxide, calcium oxide, cadmium oxide, etc. Other basically reacting inorganic metal compounds include the hydroxides, carbonates, etc.

The reaction by which the above-described derivatives are prepared is effected merely by mixing and heating the two components.

The following examples illustrate the reaction:

Example 8

A benzene solution of 2207 grams (5.2 equivalents) of a product prepared as in Example 3 was treated portionwise at 80° C. with 244 grams (6.0 equivalents) of zinc oxide. The resulting mixture was heated at reflux temperature and water collected in a distillation trap until the theoretical amount of water had been removed. The mixture was filtered through a filter aid and the filtrate freed of benzene by distillation. The amber liquid residue showed the following analyses:

| | Percent |
|---|---|
| Phosphorus | 7.7 |
| Sulfur | 16.2 |
| Zinc | 8.5 |

Example 9

A solution of 250 grams (0.9 equivalent) of a product prepared as in Example 4 and 500 grams of benzene was treated with 44 grams (0.55 equivalent) of cupric oxide. This mixture was heated at reflux temperature for 44 hours during which time the theoretical amount of water was collected in a distillation trap. The product mixture was filtered through hyflo and the filtrate concentrated by heating to a final temperature of 100° C. at 20 mm. The residue was brown liquid with the following analyses:

| | Percent |
|---|---|
| Phosphorus | 9.4 |
| Sulfur | 21.5 |
| Copper | 6.4 |

Example 10

A mixture of 50 grams (0.18 equivalent) of a product prepared as in Example 4, 19.5 grams (0.09 equivalent) of mercuric oxide and 150 ml. of benzene was prepared and heated at reflux temperature for 30 minutes, during which time the theoretical quantity of water separated. The product mixture was freed of benzene by distillation to yield a dark liquid residue which showed the following analyses:

| | Percent |
|---|---|
| Phosphorus | 8.3 |
| Sulfur | 17.2 |
| Mercury | 26.8 |

Other modes of applying the principle of the invention may be employed, change being made as regards the details described, provided the features stated in any of the following claims, or the equivalent of such, be employed.

I therefore particularly point out and distinctly claim as my invention:

1. A lubricating oil composition comprising a major proportion of a mineral lubricating oil and an amount sufficient to improve the extreme pressure properties thereof, of a substantially neutral, phosphorus- and sulfur-containing material prepared by the process which comprises reacting a phosphorodithioic acid in which the organic radicals thereof are hydrocarbon radicals, with an approximately equimolar amount of an aliphatic epoxide.

2. A lubricating oil composition comprising a major proportion of a mineral lubricating oil and an amount sufficient to improve the extreme pressure properties thereof, of a substantially neutral, phosphorus- and sulfur-containing material prepared by the process which comprises reacting a phosphorodithioic acid in which the organic radicals thereof are selected from the class consisting of alkyl, cycloalkyl, aryl, aralkyl, alkaryl, alkenyl and cycloalkenyl radicals, with an approximately equimolar amount of an aliphatic epoxide.

3. A lubricating oil composition comprising a major proportion of a mineral lubricating oil and from about 1 to about 20% by weight of a substantially neutral, phosphorus- and sulfur-containing material prepared by the process which comprises reacting a dialkyl phosphorodithioic acid with an approximately equimolar amount of a lower alkylene oxide.

4. The lubricating oil composition of claim 3 characterized further in that the said process is carried out at a temperature within the range of from about —60° C. to about 100° C.

5. A lubricating oil composition comprising a major proportion of a mineral lubricating oil and from about 1 to about 20% by weight of a substantially neutral, phosphorus- and sulfur-containing material prepared by the process which comprises reacting a dialkaryl phosphorodithioic acid with an approximately equimolar amount of a lower aliphatic epoxide.

6. The lubricating oil composition of claim 3 characterized further in that the lower alkylene oxide is propylene oxide.

References Cited by the Examiner

UNITED STATES PATENTS

| | | | |
|---|---|---|---|
| 2,266,514 | 12/41 | Romieux | 260—461.1 |
| 2,316,091 | 4/43 | White | 252—32.7 |
| 2,399,243 | 4/46 | Musselman | 252—32.7 X |
| 2,496,508 | 2/50 | Watson et al. | 252—46.6 |
| 2,570,050 | 10/51 | Eby | 260—461.1 |
| 2,586,655 | 2/52 | Hook et al. | 252—46.6 X |
| 2,783,202 | 2/57 | McDermott | 252—46.6 |
| 2,783,203 | 2/57 | McDermott | 252—46.6 |
| 2,783,204 | 2/57 | McDermott | 252—46.6 |

OTHER REFERENCES

Chemistry of Organic Compounds, Noller, 1951, Saunders Co., Philadelphia, page 690.

Organic Chemistry, Whitmore, 2nd Edition (1951), pages 310 and 311, D. Van Nostrand Co., Inc., New York.

DANIEL E. WYMAN, *Primary Examiner.*

JULIUS GREENWALD, *Examiner.*